United States Patent
Szczepanek et al.

(10) Patent No.: US 6,741,611 B1
(45) Date of Patent: May 25, 2004

(54) PACKET MEMORY MANAGEMENT (PACMAN) SCHEME

(75) Inventors: Andre Szczepanek, Hartwell (GB); Iain Robertson, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/466,038

(22) Filed: Dec. 17, 1999

(51) Int. Cl.[7] .................................................. H04J 3/24
(52) U.S. Cl. ................... 370/474; 370/412; 370/395.71
(58) Field of Search .............................. 370/412, 395.7, 370/395.71, 395.72, 474, 392, 413, 415–417, 421–429, 476

(56) References Cited

U.S. PATENT DOCUMENTS

| | | | |
|---|---|---|---|
| 5,619,497 A | * 4/1997 | Gallagher et al. | 370/394 |
| 5,633,865 A | 5/1997 | Short | 370/412 |
| 5,742,760 A | 4/1998 | Picazo, Jr. et al. | 395/200.02 |
| 5,778,414 A | 7/1998 | Winter et al. | 711/5 |
| 6,233,244 B1 | * 5/2001 | Runaldue et al. | 370/412 |
| 6,295,094 B1 | * 9/2001 | Cuccia | 348/559 |

* cited by examiner

Primary Examiner—Dang Ton
Assistant Examiner—Phuc Tran
(74) Attorney, Agent, or Firm—Wade James Brady, III; Frederick J. Telecky, Jr.

(57) ABSTRACT

The present invention is a method and system for managing memory in a communication device which operates in a shared access media environment. In one aspect of the invention, each incoming frame of data is packed and stored in blocks of no more than a predetermined block size, each block have an associated tag of control data and an associated pointer stored in a pointer memory for locating the block of data.

4 Claims, 2 Drawing Sheets

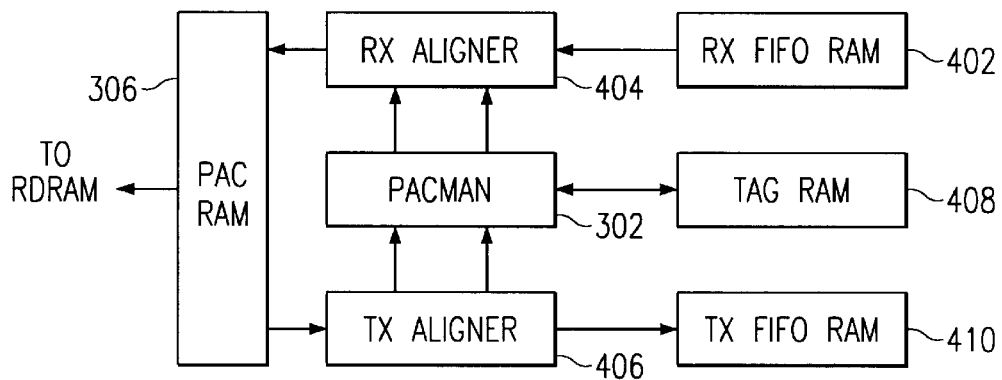
FIG. 4
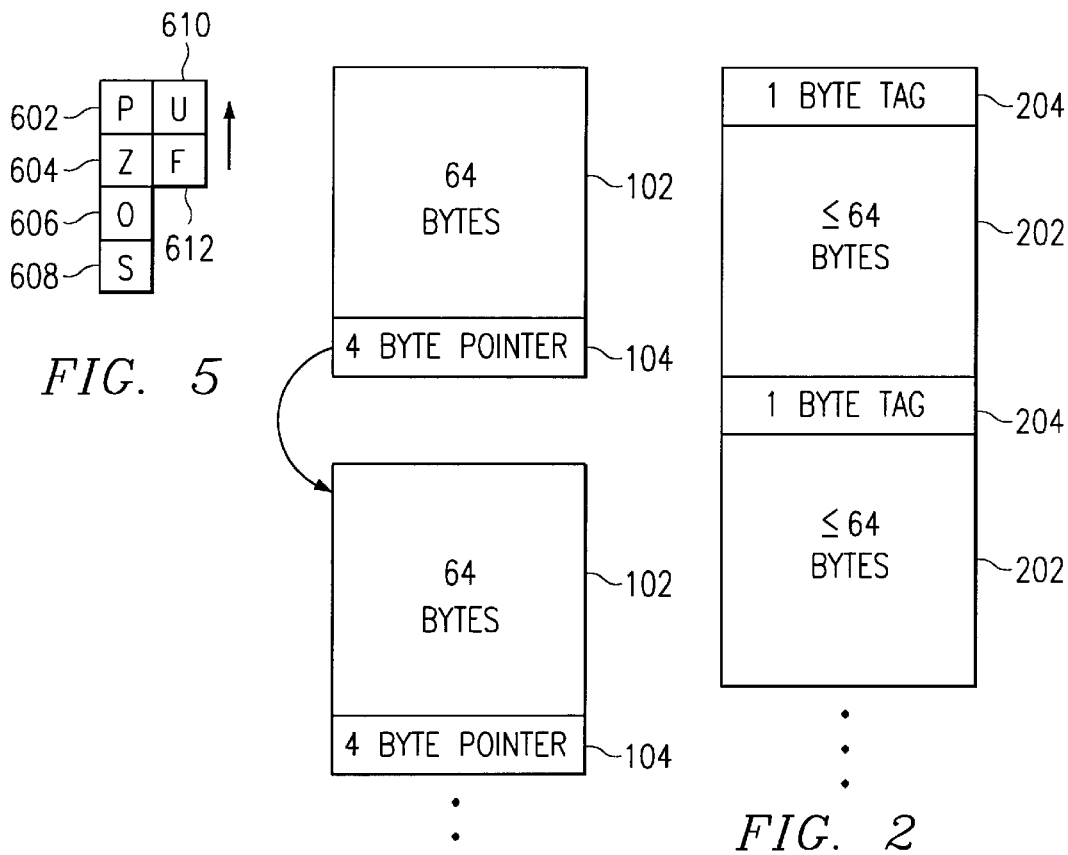
FIG. 5
FIG. 1
FIG. 2

PACKET MEMORY MANAGEMENT (PACMAN) SCHEME

TECHNICAL FIELD OF THE INVENTION

This invention relates generally to data communications and more particularly to data communications in a shared media access environment.

BACKGROUND OF THE INVENTION

This disclosure is related to a co-pending European Patent Application filed simultaneously herewith by the applicant and entitled "IN ORDER BROADCAST MANAGEMENT (IOBMAN) SCHEME", which is herein incorporated by reference in it's entirety.

In a communications device, such as an Ethernet switch, frames of data are received through ports on the device and buffered while addressing logic in the communications device processes addressing information associated with the frame to determine its destination. In general, the frames of data are stored in 64 byte blocks of memory 102 such as shown in FIG. 1, each block 102 having an associated 4 byte pointer 104 which points to the next 64 byte block of data 102 which comprises the frame. As defined in the IEEE 802.1Q standard for virtual local area networks (VLANs), the data portion of a received frame can be from 528 to 1577 bytes long.

As such, this memory management scheme is simple but not very effective when the frames of received data do not align on 64 byte margins. For example, if a frame of received data is 65 bytes long, it takes as much time and as much memory as it takes to store to and retrieve a frame of received data that is 128 bytes in length. Furthermore, no special consideration is made for broadcast frames, i.e., frames addressed to multiple destination addresses.

What is needed is a memory management scheme with improved efficiency in storing and retrieving variable length frames of data.

SUMMARY OF THE INVENTION

The present invention is a method and system for managing memory in a communication device which operates in a shared access media environment. In one aspect of the invention, each incoming frame of data is packed and stored in blocks of no more than a predetermined block size, each block have an associated tag of control data and an associated pointer stored in a pointer memory for locating the block of data.

In another aspect of the invention, the incoming frames of data are of varying size.

These and other features of the invention that will be apparent to those skilled in the art from the following detailed description of the invention, taken together with the accompanying drawings.

DESCRIPTION OF THE DRAWINGS

FIG. 1 is a block diagram of data storage in prior art memory management systems;

FIG. 2 shows a block diagram of data storage in a memory management system in accordance with the present invention;

FIG. 4 is a block diagram of a portion of a communications device which implements the memory management system of the present invention; and FIG. 5 shows registers associated with the memory management system of the present invention.

DETAILED DESCRIPTION OF THE INVENTION

Figure 3:
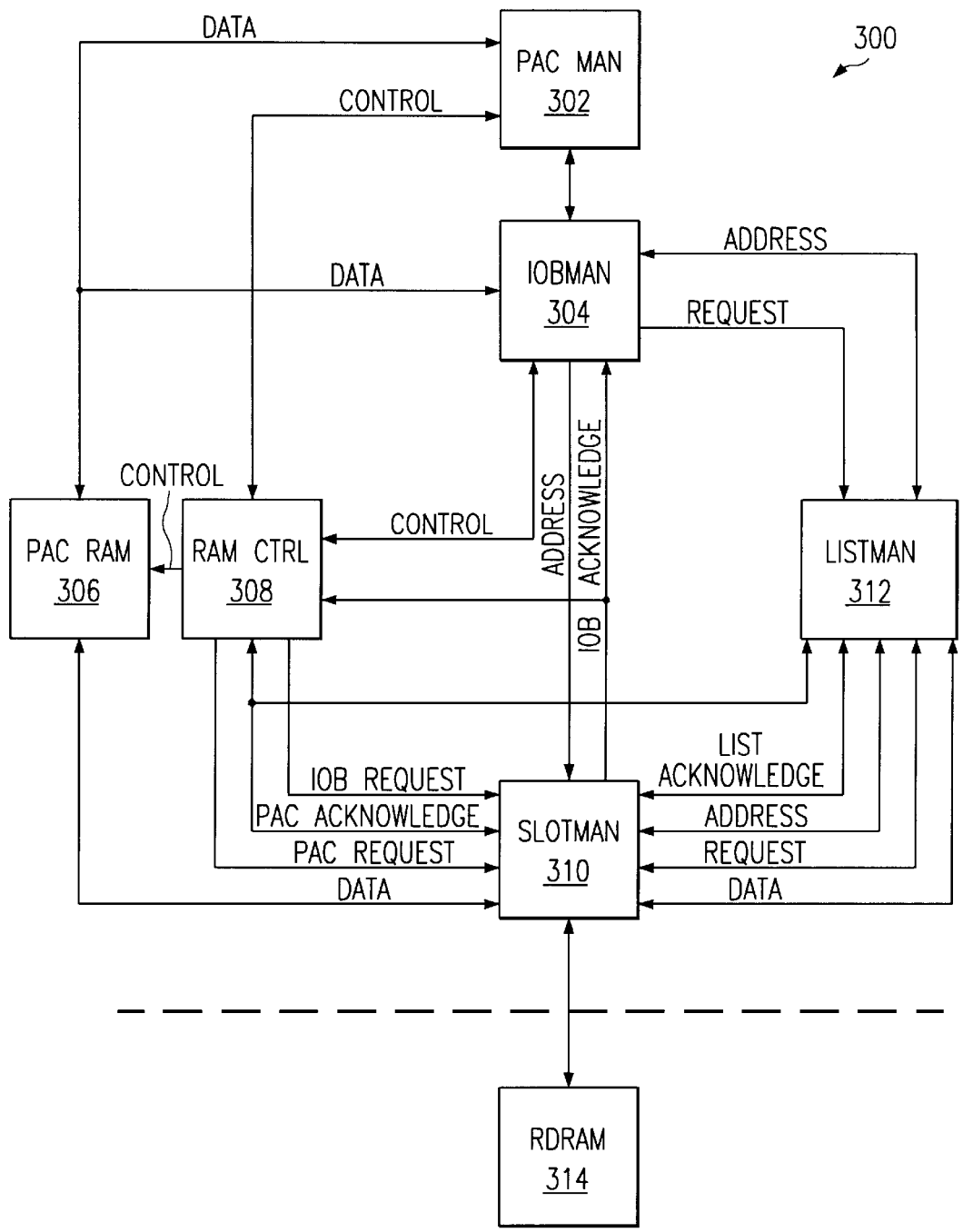
FIG. 3 illustrates a flow diagram of the operation of the memory management system in accordance with the present invention.

As shown in FIG. 2, the present invention is a memory management scheme operable to pack incoming frames of data on a communications device into block 202 of no more than 64 bytes each. Each 64 byte block 202 of data has associated with it a 1 byte tag 204. That 1 byte tag 204 comprises 2 bits of control information and 6 bits which indicate how long (again, up to 64 bytes) that particular block 202 is. The incoming blocks of data are written to memory in increments of 128 bytes. A 16 bit link pointer indicating where in memory each 64 byte block is stored is generated and stored in a separate pointer memory. Thus, links to the next block of data to be transmitted is not kept in the data frames but is instead stored separately for easy access independent of the data to which it points. Thus, as the data in a frame is transmitted out of the communications device, the link pointers are used to access the data and build up the transmit queue. This is particularly advantage in multicast transmissions where the data frame is addressed to multiple destinations. For further efficiency, a list pointer is associated with each channel on the communications device which points to the portion of the link pointer memory that includes link pointers to data blocks that are to be transmitted out of that particular channel.

FIG. 3 illustrates generally a block diagram of the memory management scheme 300 in accordance with the present invention. The memory management scheme 300 includes PACMAN module 302, packed random access memory (PACRAM) 306, RAM Control 308, slot manager (SLOTMAN) 310, list manager (LISTMAN) 312, and in order broadcast manager (IOBMAN) 304. The memory management scheme 300 is also bi-directionally coupled to external random access memory RDRAM 314. Each of these components of the memory management scheme 300 in accordance with the present invention are described in more detail hereinbelow. PACMAN 302 packs received frames of data and stores that data in PACRAM 306 in accordance with control signals transmitted to RAM Control 308. In accordance with the memory management scheme 300 of the present invention memory in PACRAM 306 is allocated to each channel of the communications device in 1K byte increments. PACMAN 302 is also operable to transfer frames of data from PACRAM 306 in 128 bytes increments.

FIG. 4 shows the operation generally of PACMAN 302 within the data communications device. As frames of data are received on a port of the communications device that data is buffered in a receive first-in-first-out random access memory (RX FIFO RAM) 402. The incoming data is aligned in receive aligner 404. PACMAN 302 is operable to pack that data in an associated PACRAM 306 upon receipt and correspondingly retrieves and unpacks the packed data stored in PACRAM 306 for transmission. The data retrieved and unpacked by PACMAN 302 is aligned for transmission in transmission (TX) aligner 406 and then stored in transmit first-in-first-out RAM (TX FIFO RAM) 410 to await transmission. Each port on the communications device managed in accordance with the memory management scheme of the present invention has an associated portion of PACRAM 306 where packed data received through that particular port is stored.

FIG. 5 shows six registers associated with the operation of PACMAN 302. These registers include pack register (P) 602, input register 604, output register 606, store register 608, fetch register 612 and update register 610. In storing and retrieving data, PACMAN 302 uses a buffer occupancy scheme as opposed to a round-robin or fan-out method in that because PACMAN 302 manages data from varying sized frames, equal time slots of service cannot be given to each port. Instead, a comparison method is used to determine which channel or channels have data to process. Thus, the registers implement a burst-based memory.

Returning to FIG. 2, PACMAN 302 stores received frames of data in 128 byte blocks of cache-like memory each frame having an associated reference mask register. The reference mask includes a bit associated with each possible port on the communications device through which the packed data may need to be transmitted. Upon processing of the destination address associated with the data, one or more reference mask bits in the associated register is asserted indicated which port or ports the data is to be transmitted through. As each block of data is transmitted through a port, the associated reference mask bit in the register is then cleared. The register is stored in memory before the start-of-frame (SOF) indicator of its associated data frame.

Returning to FIG. 3, as data is received by PACMAN 302, the data is sent to PACRAM 306 in accordance with control signals sent from PACMAN 302 to RAM CTRL 308 and corresponding control signals sent from RAM CTRL 308 to PAC RAM 306. If the data received by PACMAN 302 is unicast, i.e., destined for a single destination port, then an appropriate request signal is sent to SLOTMAN 310. SLOTMAN 310 in turn sends an acknowledgement signal to both RAM CTRL 308 and to LISTMAN 312. Once the acknowledgement signal is received from SLOTMAN 310, LISTMAN 312 then sends an address to SLOTMAN 310. PACMAN 302 sends the data to SLOTMAN 310 which stores the data to the external RDRAM 314 at the address received from LISTMAN 312. In PACMAN 302, data being placed in the S register 608 automatically initiates a write request to SLOTMAN 310. Correspondingly, an empty F register 612 automatically initiates a read request to SLOTMAN 310.

If the data is multicast, RAM CTRL 308 sends an IOB request signal to SLOTMAN 310. SLOTMAN 310 in turn sends an IOB acknowledgement signal to both RAM CTRL 308 and to IOBMAN 304. IOBMAN 304 then makes a request for an address from LISTMAN 312. When the address is received, IOBMAN sends the address to SLOTMAN 310 which retrieves the corresponding data from RDRAM 314. The data is then stored to PAC RAM 306 to await transmission. In broadcasting data destined for more than one location, IOBMAN 304, using the information stored in the reference mask, determines how many blocks of data to fetch in and when to stop fetching that data. IOBMAN 304 also keeps each particular block of data "in use" until the reference mask is modified indicating that the data has completed transmission out of a particular port.

OTHER EMBODIMENTS

Although the present invention and its advantages have been described in detail, it should be understood that various changes, substitutions, and alterations can be made herein without departing from the spirit and scope of the invention as defined by the appended claims.

What is claimed is:

1. A memory management scheme for a communications device in a shared access media comprising the steps of:

compressing a frame of incoming data in blocks of no more than a predetermined size;

associating a tag of control data and data indicative of the size of an associated block with each of said blocks;

storing each of said blocks and said associated tag of control data in a data portion of a memory;

generating a link pointer for each of said blocks to indicate where in said memory a next block is stored;

storing said link pointers to a link pointer portion of said memory; and generating a start pointer to indicate where in said link pointer portion of said memory the pointers associated with said incoming frame of data start.

2. The memory management scheme of claim 1 wherein the communications device is an Ethernet switch.

3. A system for memory management comprising:

a packet management module for compressing a frame of incoming data in blocks of no more than a predetermined size;

a packed random access memory (RAM) coupled to the packet management module for storing said blocks;

a RAM control module for managing data storage coupled to the packet management module and to the packed RAM;

a slot manager for managing data transfer coupled to the RAM control module;

a list manager for managing addresses coupled to the slot manager and the RAM control module; and an in order broadcast manager for managing multicast transmissions coupled to the packet memory management module, the packed RAM, the RAM control module, the slot manager and the list manager.

4. The system of claim 3 further comprising an external RAM coupled to the slot manager.

* * * * *